(12) United States Patent
Obata et al.

(10) Patent No.: US 6,699,574 B2
(45) Date of Patent: Mar. 2, 2004

(54) POLYPROPYLENE-BASED RESIN COMPOSITION FOR STRETCHED FILM, PROCESS FOR PRODUCING THE SAME AND STRETCHED FILM

(75) Inventors: Yoichi Obata, Sodegaura (JP); Shunji Yunoki, Sapporo (JP); Takeshi Ebara, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 102 days.

(21) Appl. No.: 10/098,486

(22) Filed: Mar. 18, 2002

(65) Prior Publication Data

US 2003/0055173 A1 Mar. 20, 2003

(30) Foreign Application Priority Data

Mar. 22, 2001 (JP) ........................................ 2001-082248

(51) Int. Cl.$^7$ .............................. B32B 7/02; C08L 22/00
(52) U.S. Cl. ...................... 428/221; 525/185; 525/191; 525/240; 525/242; 264/210.1; 264/210.7
(58) Field of Search .......................... 428/221; 525/185, 525/191, 240, 242; 264/210.1, 210.7

(56) References Cited

U.S. PATENT DOCUMENTS

4,791,144 A * 12/1988 Nagou et al. ................... 521/90
2002/0193527 A1 * 12/2002 Nakata et al. ............... 525/240
2002/0198318 A1 * 12/2002 Obata et al. ................... 525/88

FOREIGN PATENT DOCUMENTS

| JP | 58-173141 A | 10/1983 |
| JP | 6-248133 A | 9/1994 |

* cited by examiner

*Primary Examiner*—Samuel A. Acquah
(74) *Attorney, Agent, or Firm*—Sughrue Mion, PLLC

(57) ABSTRACT

A polypropylene-based resin composition for stretched film, comprising 20 to 98 parts by weight of a propylene-based polymer(A) having an intrinsic viscosity $[\eta]^A$ of 1.8 to 8 dl/g and a melting temperature $Tm^A$ of 140 to 165 °C. and 2 to 80 parts by weight of a propylene-based polymer(B) having an intrinsic viscosity $[\eta]^B$ of 0.8 to 1.7 dl/g and a melting temperature $Tm^B$ of 150 to 170° C., wherein the ratio of $Tm^A$ to $Tm^B$ is less than 1, the ratio of the intrinsic viscosity $[\eta]^A$ to the intrinsic viscosity $[\eta]^B$ is more than 1 and less than 10, and the melt flow rate of the polypropylene-based resin composition is from 0.1 to 20 g/10 min.

4 Claims, No Drawings

POLYPROPYLENE-BASED RESIN COMPOSITION FOR STRETCHED FILM, PROCESS FOR PRODUCING THE SAME AND STRETCHED FILM

BACKGROUND OF THE INVENTION

1. Field of the Invention

The present invention relates to a polypropylene-based resin composition for stretched film, a process for producing this resin composition, and a stretched film. More particularly, the present invention relates to a polypropylene-based resin composition for stretched film, having transparency and anti-blocking property maintained at practical levels and excellent rigidity and stretching processability, and small heat shrinkage percentage, to a process for producing said resin composition, and to a stretched film made of the resin composition.

2. Description of Related Arts

Polypropylene-based stretched films are widely used as packaging materials, and there are conventionally known methods of mixing polypropylenes having different physical properties for improving the physical properties and stretching processability of a polypropylene-based stretched film.

For example, methods of mixing polypropylenes having different molecular weights are known, and JP58-173141A discloses a method for producing a polypropylene-based resin composition enabling the production of a stretched material excellent in extrusion moldability and stretching property for extrusion stretching, comprising producing a propylene homopolymer or random copolymer having a melt flow index of 0.02 to 5 g/10 minutes and a propylene homopolymer or random copolymer having a melt flow index of 50 to 1000 g/10 minutes by means of polymerization.

Further, JP06-248133A discloses a propylene-based composition rich in extrusion moldability and excellent in balance between rigidity and impact resistance, composed of a polypropylene of high molecular weight having an intrinsic viscosity of 1.0 or more and an meso pentad fraction of 0.90 or more and a highly stereoregular polypropylene of relatively low molecular weight having an intrinsic viscosity of 0.1 to 0.8 and an meso pentad fraction of 0.93 or more, and.

However, for use as stretched films of the propylene-based resin compositions mentioned above, improvement of rigidity, heat shrinkage percentage and stretching processability has been desired.

SUMMARY OF THE INVENTION

An object of the present invention is to provide a polypropylene-based resin composition for stretched film, having a transparency and anti-blocking property maintained at a practical level, excellent rigidity and stretching processability, small heat shrinkage percentage, a process for producing said resin composition, and a stretched film made of the same.

Namely, the present invention relates to a polypropylene-based resin composition for stretched film, comprising:

20 to 98 parts by weight of a propylene-based polymer(A) having an intrinsic viscosity $[\eta]^A$ measured intetralinat 135° C. of 1.8 to 8 dl/g and a melting temperature $Tm^A$ measured by a differential scanning calorimeter (herein-after, referred to as "DSC") of 140 to 165° C., and 2 to 80 parts by weight of a propylene-based polymer B having an intrinsic viscosity $[\eta]^B$ measured in tetralin at 135° C. of 0.8 to 1.7 dl/g and a melting temperature $Tm^B$ measured by DSC of 150 to 170° C., wherein the ratio of the melting temperature $Tm^A$ of the propylene-based polymer(A) to the melting temperature $Tm^B$ of the propylene-based polymer(B) ($Tm^A/Tm^B$) is less than 1, the ratio of the intrinsic viscosity $[\eta]^A$ of the propylene-based polymer(A) to the intrinsic viscosity $[\eta]^B$ of the propylene-based polymer(B) ($[\eta]^A/[\eta]^B$) is more than 1 and less than 10 ($1<[\eta]^A/[\eta]^B<10$), and the melt flow rate is from 0.1 to 20 g/10 minutes; a process for producing said resin composition; and a stretching film made of the same.

The present invention will be described in detail below.

DETAILED DESCRIPTION OF THE INVENTION

The propylene-based polymer(A) used in the present invention is a propylene homopolymer or a propylene-based random copolymer. As the propylene-based random copolymer, propylene-based random copolymers obtained by copolymerizing propylene with ethylene and/or at least one comonomer selected from α-olefins having 4 to 20 carbon atoms are mentioned.

Examples of the α-olefin having 4 to 20 carbon atoms include, for example, 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, dimethyl-1-butene, 1-nonene, 1-decene, 1-undecene, 1-dodecene and the like, preferably 1-butene, 1-pentene, 1-hexene and 1-octene, and more preferably 1-butene and 1-hexene.

As the propylene-based random copolymer(A), for example, a propylene-ethylene random copolymer, propylene-α-olefin random copolymer and the like are listed. Examples of the propylene-α-olefin random copolymer include, for example, a propylene-1-butene random copolymer, propylene-1-hexene random copolymer, propylene-1-octene random copolymer, propylene-ethylene-1-butene random copolymer, propylene-ethylene-1-hexene random copolymer, propylene-ethylene-1-octene random copolymer and the like, and preferably a propylene-ethylene random copolymer, propylene-1-butene random copolymer, propylene-1-hexene random copolymer, propylene-ethylene-1-butene random copolymer and propylene-ethylene-1-hexene random copolymer.

When the propylene-based random copolymer(A) is a propylene-ethylene random copolymer, the ethylene content is preferably 4% by weight or less, more preferably 3.5% by weight or less, further preferably 3% by weight or less, from the standpoint of the rigidity of the resulting polypropylene-based stretched film.

When the propylene-based random copolymer(A) is a propylene-α-olefin random copolymer, the α-olefin content is preferably 15% by weight or less, more preferably 12% by weight or less, further preferably 8% by weight or less, from the standpoint of the rigidity of the resulting polypropylene-based stretched film.

When the propylene-based random copolymer(A) is a propylene-ethylene-α-olefin random copolymer, the total content of ethylene and α-olefin is preferably 15% by weight or less, more preferably 12% by weight or less, further preferably 8% by weight or less, from the standpoint of the rigidity of the resulting polypropylene-based stretched film.

The intrinsic viscosity [η] measured in tetralin at 135° C. of the propylene-based polymer(A) used in the present invention is from 1.8 to 8 dl/g, preferably 1.9 to 6 dl/g. When the intrinsic viscosity [η] of the propylene-based polymer (A) is less than 1.8 dl/g, the stretching processability of the resulting polypropylene-based resin composition may deteriorate, and when over 8 dl/g, the flowability in extrusion processing of the resulting polypropylene-based resin composition may deteriorate, and granule structures may tend to generate.

The melting temperature Tm measured by DSC of the propylene-based polymer A used in the present invention is from 140 to 165° C., more preferably from 143 to 164° C., further preferably from 147 to 163° C. When the melting temperature Tm of the propylene-based polymer(A) is less than 140° C., the rigidity of the resulting polypropylene-based stretched film may be deficient, and when over 165° C., the stretching processability of the polypropylene-based resin composition for stretched film may deteriorate. Herein, the melting temperature Tm is determined from the peak temperature of a melting curve measured by DSC.

The meso-pentad fraction of the propylene-based polymer (A) used in the present invention is preferably from 0.7 to 0.99, more preferably from 0.8 to 0.98, from the standpoint of the rigidity of the resulting polypropylene-based stretched film.

The 20° C. xylene soluble part (hereinafter, abbreviated as "CXS") of the propylene-based polymer(A) used in the present invention is preferably 10% by weight or less, more preferably 6% by weight or less, from the standpoint of the rigidity and anti-blocking property of the resulting polypropylene-based stretched film.

The propylene-based polymer(B) used in the present invention is a propylene homopolymer or a propylene-based random copolymer, and preferably a propylene homopolymer. When the propylene-based polymer(B) is a propylene-based random copolymer, propylene-based random copolymers obtained by copolymerizing propylene and ethylene and/or at least one comonomer selected from α-olefins having 4 to 20 carbon atoms are mentioned. As the α-olefin having 4 to 20 carbon atoms, the same examples as for the above-mentioned α-olefin having 4 to 20 carbon atoms in the propylene-based random polymer(A) are listed, and as the propylene-based random copolymer used as the propylene-based polymer(B), the same examples as for the above-mentioned propylene-based random copolymer used as the propylene-based polymer(A) are listed.

When the propylene-based polymer(B) is a propylene-ethylene random copolymer, the ethylene content is preferably 2% by weight or less, more preferably 1.5% by weight or less, further preferably 1% by weight or less, from the standpoint of the rigidity of the resulting polypropylene-based stretched film.

When the propylene-based polymer(B) is a propylene-α-olefin random copolymer, the α-olefin content is preferably 6% by weight or less, more preferably 4% by weight or less, further preferably 3% by weight or less, from the standpoint of the rigidity of the resulting polypropylene-based stretched film.

When the propylene-based polymer(B) in the present invention is a propylene-ethylene-α-olefin random copolymer, the total content of ethylene and α-olefin is preferably 6% by weight or less, more preferably 4% by weight or less, further preferably 3% by weight or less, from the standpoint of the rigidity of the resulting polypropylene-based stretched film.

The intrinsic viscosity [η] measured in tetralin at 135° C. of the propylene-based polymer(B) is from 0.8 to 1.7 dl/g, preferably 0.85 to 1.65 dl/g, more preferably 0.90 to 1.6 dl/g. When the intrinsic viscosity [η] of the propylene-based polymer B is less than 0.8 dl/g, the stretching property of the resulting polypropylene-based resin composition for stretched film may deteriorate, and when over 1.7 dl/g, the rigidity of the resulting polypropylene-based stretched film may be deficient.

The melting temperature Tm measured by DSC of the propylene-based polymer(B) used in the present invention is from 150 to 170° C., preferably from 155 to 167° C., more preferably from 160 to 166° C. When the melting temperature Tm of the propylene-based polymer(B) is less than 150° C., the rigidity of the resulting polypropylene-based stretched film may be deficient, and usually, production of a propylene-based polymer having a melting temperature Tm of over 170° C. is difficult.

The meso-pentad fraction of the propylene-based polymer (B) used in the present invention is preferably from 0.7 to 0.99, more preferably from 0.8 to 0.99.

The CXS of the propylene-based polymer(B) is preferably 4% by weight or less, more preferably 3% by weight or less, from the standpoint of the rigidity and anti-blocking property of the resulting polypropylene-based stretched film.

The content of the propylene-based polymer(A) in the polypropylene-based resin composition of the present invention is from 20 to 98 parts by weight, and the content of the propylene-based polymer(B) is from 2 to 80 parts by weight. Herein, the total amount of the propylene-based polymers (A) and (B) is 100 parts by weight. Preferably, the content of the propylene-based polymer(A) is from 25 to 96 parts by weight, and more preferably, the content of the propylene-based polymer(A) is from 30 to 94 parts by weight.

When the content of the propylene-based polymer(A) is less than 20 parts by weight, the stretching processability of the polypropylene-based resin composition may deteriorate, and when the content of the propylene-based polymer A is over 98 parts by weight, the rigidity of the polypropylene-based stretched film may be deficient.

The ratio of the melting temperature $Tm^A$ of the propylene-based polymer(A) to the melting temperature $Tm^B$ of the propylene-based polymer(B) ($Tm^A/Tm^B$) in the polypropylene-based resin composition of the present invention is less than 1, preferably 0.99 or less, more preferably 0.98 or less. When the ratio of the melting temperature $Tm^A$ to the melting temperature $Tm^B$ ($Tm^A/Tm^B$) is 1 or more, the rigidity of the resulting polypropylene-based stretched film may be deficient.

The ratio of the intrinsic viscosity $[\eta]^A$ of the propylene-based polymer(A) to the intrinsic viscosity $[\eta]^B$ of the propylene-based polymer(B) ($[\eta]^A/[\eta]^B$) in the polypropylene-based resin composition of the present invention is more than 1 and less than 10 ($1<[\eta]^A/[\eta]^B<10$), preferably from 1.2 to 9, more preferably from 1.4 to 8. When the ratio of the intrinsic viscosity $[\eta]^A$ to the intrinsic viscosity $[\eta]^B$ ($[\eta]^A/[\eta]^B$) is 1 or less, the rigidity of the polypropylene-based stretched film may be deficient, and when 10 or more, the flowability in extrusion processing of the resulting polypropylene-based resin composition may deteriorate, and granule structures may tend to generate.

The melt flow rate of the polypropylene-based resin composition of the present invention is from 0.1 to 20 g/10 minutes, preferably from 0.5 to 15 g/10 minutes, more preferably from 1 to 10 g/10 minutes. When the melt flow rate of the polypropylene-based resin composition is less than 0.1 g/10 minutes, the melt viscosity of propylene in a molten state is too high and the flowability in extrusion processing may be deficient, and when over 20 g/10 minutes, the formability such as stretching processability and the like may deteriorate.

The melting temperature Tm of the polypropylene-based resin composition for stretched film of the present invention is preferably from 145 to 166° C., more preferably from 150 to 164° C., further preferably from 155 to 163° C. from the standpoint of simultaneous manifestation of particularly excellent stretching processability and rigidity, and a small heat shrinkage percentage.

The CXS of the polypropylene-based resin composition for stretched film of the present invention is preferably 4% by weight or less, more preferably 3.5% by weight or less, further preferably 3% by weight or less, from the standpoints of simultaneous manifestation of particularly excellent stretching processability and rigidity and a small heat contraction percentage, and of anti-blocking property.

As the process for producing the polypropylene-based resin composition for stretched film of the present invention, there are a method in which a propylene-based polymer(A) and a propylene-based polymer(B) are separately produced by individual polymerization, and are mixed, and a method in which using a two or more multi-stage polymerization method, and a propylene-based polymer(A) and a propylene-based polymer(B) in any stage, for example, a propylene-based polymer(A) are produced in the first step, or the second or latter steps and a propylene-based polymer (B) are produced in the second or latter steps, or the first step, respectively.

The method for each individual polymerization of a propylene-based polymer(A) and a propylene-based polymer(B) in the method comprising each individual polymerization of a propylene-based polymer(A) and a propylene-based polymer(B) and mixing of the polymer(A) and the polymer B obtained by each individual polymerization, is not particularly restricted, and known polymerization methods are mentioned. For example, there are a solvent polymerization method conducted in the presence of an inert solvent, a bulk polymerization method conducted in the presence of a liquid monomer, a gas phase polymerization method conducted in the substantial absence of a liquid medium, and the like. Preferable is a gas phase polymerization method. Further, polymerization methods combining two or more of the above-mentioned polymerization methods, and a two or more multi-stage polymerization method and the like are also mentioned.

The process for mixing the propylene-based polymer(A) and the propylene-based polymer(B) obtained by each individual polymerization is not particularly restricted, and methods of dispersing these polymer(A) and polymer(B) uniformly may be permissible. For example, there are a method in which a polymer(A) and a polymer(B) are mixed by a ribbon blender, Henschel mixer, tumbler mixer or the like, and the mixture is melt-kneaded by an extruder or the like, a method in which a polymer(A) and a polymer(B) are each individually melt-kneaded to be palletized, and the palletized polymer(A) and polymer (B) are mixed by the same manner as described above, and further melt-kneaded, a method in which a polymer(A) and a polymer(B) are each individually melt-kneaded to be palletized, and the palletized polymer(A) and polymer(B) are blended by dry blend or the like, then, mixed directly by a film forming machine, a method in which a polymer(A) and a polymer(B) are each individually melt-kneaded to be palletized, and the palletized polymer(A) and polymer(B) are each individually fed through an extruder of a film forming machine to be mixed, and other methods. Further, there are also exemplified a method in which a master batch containing 1 to 99 parts by weight of a propylene-based polymer(A) based on 100 parts by weight of a propylene-based polymer(B) is previously produced, and appropriately mixed so as to provide a given concentration, and the like.

Furthermore, in mixing the propylene-based polymer(A) and the propylene-based polymer(B) obtained by each individual polymerization, stabilizers, lubricants, antistatic agents, anti-blocking agents, inorganic or organic fillers and the like may also be added, in amounts not deteriorating the object and effect of the present invention.

The method for producing a propylene-based polymer(A) and a propylene-based polymer(B) by means of a two or more multi-step polymerization, is not particularly restricted, and known polymerization methods are mentioned. For example, there are a method in which a solvent polymerization method conducted in the presence of an inactive solvent, a block polymerization method conducted in the presence of a monomer in the form of liquid, a gas phase polymerization method conducted in the substantial absence of a medium in the form of liquid, and other methods are optionally used in combination of two or more and a propylene-based polymer(A) and a propylene-based polymer(B) are polymerized in any of these stages, and other methods.

The polypropylene resin composition obtained by the multi-stage polymerization method may further mixed, and as the process for further mixing, a method of melt-kneading by an extruder or the like, and the like are listed. In the mixing, additives and fillers as described above may also be added.

As the polymerization catalyst used for production of a propylene-based polymer(A) and a propylene-based polymer(B) used in the present invention, a catalyst for stereoregular polymerization of propylene is used both in the case of each individual polymerization of them and in the case of use of the multi-stage polymerization method.

The catalyst for stereoregular polymerization of propylene includes, for example, a titanium trichloride catalyst, catalyst systems prepared by combining an organoaluminum compound and optionally a third component such as an electron donative compound, with a solid catalyst component such as a Ti—Mg-based catalyst containing titanium, magnesium, halogen and electron donor as essential components, metallocene-based catalysts and the like.

Preferable are solid catalyst components containing magnesium, titanium, halogen and electron donor as essential components, and catalysts obtained by combining an organoaluminum compound and an electron donative compound, and specific examples thereof include catalyst systems described in U.S. Pat. Nos. 5,608,018, 4,743,665 and 4,672,050.

The methods of forming and stretching the polypropylene-based composition stretched film of the present invention are not particularly restricted, and a uniaxial stretching and biaxial stretching, that is, generally, a machine direction uniaxial stretching, transverse direction uniaxial stretching, sequential biaxial stretching, simultaneous biaxial stretching, tubular biaxial stretching and the like are listed. These stretching methods are described below.

Machine Direction Uniaxial Stretching

A polypropylene is melted by an extruder, then, extruded through a T die, and solidified in the form of sheet by cooling with a cooling roller. Then, the resulted sheet is pre-heated and stretched in the machine direction by a series of heating rolls, and if necessary, subjected to a corona treatment or the like, and wound.

Transverse Direction Uniaxial Stretching

A polypropylene is melted by an extruder, then, extruded through a T die, and solidified in the form of sheet by cooling with a cooling roller. Then, both ends of the resulted sheet are clamped by two lines of chucks arranged along the flow direction, and stretched in the transverse direction by spreading the interval of the above-mentioned two lines of chucks in a heating furnace composed of a pre-heating part, stretching part and heat treatment part, and if necessary, subjected to a corona treatment or the like, and wound.

Sequential Biaxial Stretching

A polypropylene is melted by an extruder, then, extruded through a T die, and solidified by cooling with a cooling roll. Then, the resulted sheet is pre-heated and stretched in the machine direction by a series of heating rolls. Subsequently, both ends of the resulted sheet are clamped by two lines of chucks arranged along the flow direction, and stretched in the transverse direction by spreading the interval of the above-mentioned two lines of chucks in aheating furnace composed of a pre-heating part, stretching part and heat treatment part, and if necessary, subjected to a corona treatment or the like, and wound.

The fusion temperature of polypropylene in the sequential biaxial stretching is usually from 230 to 290° C. The machine direction stretching temperature is usually from 130 to 150° C., and the machine direction stretching magnification is usually from 4 to 6. The transverse stretching temperature is usually from 150 to 165° C., and the transverse stretching magnification is usually from 8 to 10.

Simultaneous Biaxial Stretching

A polypropylene is melted by an extruder, then, extruded through a T die, and solidified by cooling with a cooling roller. Subsequently, both ends of the resulted sheet are clamped by two lines of chucks arranged along the flow direction, and stretched in the machine direction and transverse direction simultaneously by spreading the interval of the above-mentioned two lines of chucks and the interval between chucks in individual line in a heating furnace composed of a pre-heating part, stretching part and heat treatment part, and if necessary, subjected to a corona treatment or the like, and wound.

Tubular Biaxial Stretching

A polypropylene is melted by an extruder, then, extruded through an annular die, and solidified in the form of tube by cooling in a water tank. Then, the resulted tube is pre-heated with a heat furnace or a series of heat rolls, then, passed through low speed nip rolls, and wound with high speed nip rolls to be stretched along the flow direction. In this operation, the tube is stretched also in the transverse direction, by swelling the tube with the action of internal pressure of air accumulated between the low speed nip rolls and the high speed nip rolls. The stretched film passed through the high speed nip rolls is thermally treated by a heating furnace or series of heat rolls, and if necessary, subjected to a corona treatment or the like, and wound.

EXAMPLES

The present invention will be illustrated by the following Examples and Comparative Examples in detail below, but is not limited thereto.

Methods of forming stretched films used in Examples and Comparative Examples and evaluations stretching processability were carried out according to the following methods.

(I) Film Forming

A polypropylene-based resin composition was extruded at a resin temperature of 260° C. using a T die sheet forming machine having a screw diameter of 65 mmφ, and solidified by a cooling roll at 30° C. to give a sheet having a thickness of 1 mm. Then, this sheet was stretched between rolls in the machine direction (MD) at a stretching magnification of 5, using a machine direction stretching machine at a stretching temperature of 145° C. Then, the resulted machine direction-stretched sheet was stretched in the transverse direction (TD) at a stretching magnification of 8 as machine magnification, using a transversal stretching machine of tenter mode at a stretching temperature of 157° C., then, relaxed by 13.5% and thermally treated at 165° C., to produce a film having a thickness of 25 μm at a film forming speed of 25 m/min. The resulted film was aged at 40° C. for 3 days and used for measurement of the physical properties of the film.

(II) Evaluation of Stretching Processability

A polypropylene was molded into a press sheet having a thickness of 500 μm according to JIS K6758-81, then, a sample of 90 mm×90 mm was collected from the sheet, biaxially stretched under the following conditions, and the mechanical stress in stretching was recorded. The stretching stress, when the stretching magnification was 1.5, was evaluated as stretching property. When the stretching stress is smaller, the stretching property is more excellent.

Stretching machine: Biaxial stretching test apparatus manufactured by Toyo Seiki K.K.

Pre-heating temperature: 155° C.

Pre-heating time: 3 minutes

Stretching magnification: 5×5-fold

Stretching speed: 5 m/min.

The physical properties of propylene-based polymers, polypropylene-based resin compositions and stretched films used in Examples and Comparative Examples were measured according to the following methods.

(1) Intrinsic Viscosity ([η], Unit: dl/g)

It was measured at a temperature of 135° C. using tetralin as a solvent, by using a Ubbellohde viscometer.

(2) Melting Temperature (Tm, Unit: ° C.)

A propylene-based polymer or polypropylene-based resin composition was pre-heated for 5 minutes by hot press molding (230° C.), then, the pressure was raised to 50 kgf/cm$^2$ over 3 minutes, and the pressure was kept for 2 minutes. Thereafter, the resin was cooled for 5 minutes under a pressure of 30 kgf/cm$^2$ at 30° C. Next, using a differential scanning calorimeter (DSC-7, manufactured by Perkin Elmer, Ltd.), 10 mg of the sample collected from the sheet was thermally treated at 220° C. for 5 minutes, then, cooled to 150° C. at a cooling rate of 300° C./min. and kept at 150° C. for 1 minute, further cooled to 50° C. at a cooling rate of 5° C./min. and kept at 50° C. for 1 minute, and further heated from 50° C. to 180° C. at a heating rate of 5° C./min., and the melting peak temperature in this operation was determined as the melting temperature Tm (C).

(3) Melt Flow Rate (MFR, Unit: g/10 minutes)

It was measured according to JIS K7210.

(4) 20° C. Xylene Soluble Part (CXS, Unit: wt %)

10 g of a propylene-based polymer was dissolved in 1000 ml of boiling xylene, then, cooled gradually to 50° C., then, cooled down to 20° C. by immersing into ice water while stirring, and left over night at 20° C., then, the precipitated polymer was filtrated off, xylene was evaporated from the filtrate, and the residue was dried at 60° C. under reduced pressure to recover polymers soluble in xylene at 20° C. and the xylene soluble part was calculated.

(5) Meso-Pentad Fraction

It was quantified using a signal of a carbon atom of a methyl group by $^{13}$C-NMR (EX-270, manufactured by BRUKER Corporation) based on a literature published by A. Zambelli et al. in Macromolecules, vol. 13, pp. 687 to 689 (1975). Dueterized o-dichlorobenzene was used as a solvent, and the meso-pentad fraction was measured at 135° C.

(6) Comonomer Content (Unit: wt %)

① Ethylene Content

It was determined by an IR spectrum method according to a method described in Polymer Analysis Handbook (1985, published by Asakura Shoten), p. 256, "(i) Random copolymer"

② 1-Butene Content

It was determined by the following expression according to an IR spectrum method.

1-butene content (wt %)=1.208 K'

K': absorbance at 767 cm$^{-1}$ (7) Haze (Unit: %)

It was measured according to ASTM D1103 using the film obtained in the above-mentioned (I) Film forming.

(8) Anti-Blocking Property (Unit: kg/12 cm$^2$)

Two films of 30 mm×150 mm were collected from the film obtained in the above-mentioned (I) Film forming, and parts of 40 mm along the longitudinal direction of two films are piled each other and these were sandwiched between tracing paper, and conditioned under a load of 0.5 kg at 60° C. for 3 hours. Then, the laminate was left under an atmosphere of 23° C. and relative humidity of 50% for 30 minutes or more, and a shearing tensile test was effected at a speed of 200 mm/min. Four measurements were effected on each of four pieces of the same film, the average of data was calculated, to give a value as a strength required for peeling in the test. When the value is smaller, the anti-blocking property is more excellent.

(9) Young's Modulus (Unit: kg/cm$^2$)

From the film obtained in the above-mentioned (I) Film forming, specimens having a width of 20 mm were collected from the machine direction (MD) and the transverse direction (TD), and an S-S curve was recorded by a tensile tester at a chuck interval of 60 mm and a tensile speed of 5 mm/min., and the initial modulus was measured.

(10) Heat Shrinkage Percentage (Unit: %)

From the film obtained in the above-mentioned (I) Film forming, a film specimen of 30 cm along the MD direction and 20 cm along the TD direction was collected, and two parallel lines were drawn at an interval of 10 cm both along the MD direction and TD direction. The specimen was allowed to stand still for 5 minutes in an oven of 120° C., then, removed, and cooled for 30 minutes at room temperature, then, the length of the evaluation line on the specimen was measured. The heat shrinkage percentage was calculated by the following formula.

Heat contraction percentage=100×{(10−length of evaluation line after heating (cm))/10}}

(Process for Producing Propylene-Based Polymer(A) and Propylene-Based Polymer(B))

The propylene-based polymer A and propylene-based polymer B used in Examples and Comparative Examples were produced, by homo-polymerizing propylene according to gas phase polymerization using a catalyst system described in JP0 7-216017A. The physical properties of the resulted propylene-based polymer A and propylene-based polymer B are shown in Table 1.

Example 1

90 parts by weight of a powder of the propylene polymer A1, 10 parts by weight of a powder of the propylene polymer B1, 0.1 part by weight of calcium stearate as a neutralizing agent, 0.15 parts by weight of Irganox1010 (trade name) manufactured by Ciba Specialty Chemicals Ltd. and 0.1 part by weight of Irgafos 168 (trade name) manufactured by Ciba Specialty Chemicals Ltd. as stabilizers, 0.04 parts by weight of cross-linked polymer beads having an average particle size of 1.2 μm measured by a coulter counter and 0.16 parts by weight of cross-linked polymer beads having an average particle size of 1.8 μm measured by a coulter counter as anti-blocking agents, and 0.5 parts by weight of a mixture of stearyldiethanolamine, alkyldiethanolamine monoester and stearyldiethanolamine diester as antistatic agents, were mixed by a Henschel mixer, then, granulated by a 65 mmφ extruder at 220° C. to give pellets. The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Example 2

90 parts by weight of a powder of the propylene polymer A1, 10 parts by weight of a powder of the propylene polymer B2, 0.1 part by weight of calcium stearate as a neutralizing agent, 0.15 parts by weight of Irganox1010 (trade name) manufactured by Ciba Specialty Chemicals Ltd. and 0.1 part by weight of Irgafos 168 (trade name) manufactured by Ciba Specialty Chemicals Ltd. as stabilizers, and 0.04 parts by weight of cross-linked polymer beads having an average particle size of 1.2 μm measured by a coulter counter and 0.16 parts by weight of cross-linked polymer beads having an average particle size of 1.8 μm measured by a coulter counter as anti-blocking agents were mixed by a Henschel mixer, then, granulated by a 65 mmφ extruder at 220° C. to give pellets. The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Example 3

Example 2 was repeated except that the amounts of the powder of the propylene polymer A1 and the powder of the propylene polymer B2 were changed to 80 parts by weight and 20 parts by weight, respectively.

The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Comparative Example 1

100 parts by weight of a powder of the propylene polymer A1, 0.1 part by weight of calcium stearate as a neutralizing agent, 0.15 parts by weight of Irganox1010 (trade name) manufactured by Ciba Specialty Chemicals Ltd. and 0.1 part by weight of Irgafos 168 (trade name) manufactured by Ciba Specialty Chemicals Ltd. as stabilizers, 0.04 parts by weight of cross-linked polymer beads having an average particle size of 1.2 μm measured by a coulter counter and 0.16 parts by weight of cross-linked polymer beads having an average particle size of 1.8 μm measured by a coulter counter as anti-blocking agents, and 0.5 parts by weight of a mixture of stearyldiethanolamine, alkyldiethanolamine monoester and stearyldiethanolamine diester as antistatic agents, were mixed by a Henschel mixer, then, granulated by a 65 mmφ extruder at 220° C. to give pellets. The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Comparative Example 2

100 parts by weight of a powder of the propylene polymer A1, 0.1 part by weight of calcium stearate as a neutralizing agent, 0.15 parts by weight of Irganox1010 (trade name) manufactured by Ciba Specialty Chemicals Ltd. and 0.1 part by weight of Irgafos 168 (tradename) manufactured by Ciba Specialty Chemicals Ltd. as stabilizers, 0.04 parts by weight of cross-linked polymer beads having an average particle size of 1.2 μm measured by a coulter counter and 0.16 parts by weight of cross-linked polymer beads having an average particle size of 1.8 μm measured by a coulter counter as anti-blocking agents, 0.5 parts by weight of a mixture of stearyldiethanolamine, alkyldiethanolamine monoester and stearyldiethanolamine diester as antistatic agents, and 0.038 parts by weight of Perhexa 25B manufactured by NOF Corp. as a molecular weight controlling agent were mixed by a Henschel mixer, then, granulated by a 65 mmφ extruder at 220° C. to give pellets. The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Comparative Example 3

100 parts by weight of a powder of the propylene polymer B1, 0.1 part by weight of calcium stearate as a neutralizing agent, 0.15 parts by weight of Irganox1010 (trade name) manufactured by Ciba Specialty Chemicals Ltd. and 0.1 part by weight of Irgafos 168 (trade name) manufactured by Ciba Specialty Chemicals Ltd. as stabilizers, 0.04 parts by weight of cross-linked polymer beads having an average particle size of 1.2 μm measured by a coulter counter and 0.16 parts by weight of cross-linked polymer beads having an average particle size of 1.8 μm measured by a coulter counter as anti-blocking agents, and 0.5 parts by weight of a mixture of stearyldiethanolamine, alkyldiethanolamine monoester and stearyldiethanolamine diester as antistatic agents were mixed by a Henschel mixer, then, granulated by a 65 mmφ extruder at 220° C. to give pellets. The results of measurement of the physical properties of the resulted propylene-based resin composition are shown in Table 2. Stretching was impossible when the resulted polypropylene-based resin composition was used.

Comparative Example 4

100 parts by weight of a powder of the propylene polymer A1, 0.1 part by weight of calcium stearate as a neutralizing agent, 0.15 parts by weight of Irganox1010 (trade name) manufactured by Ciba Specialty Chemicals Ltd. and 0.1 part by weight of Irgafos 168 (trade name) manufactured by Ciba Specialty Chemicals Ltd. as stabilizers, and 0.04 parts by weight of cross-linked polymer beads having an average particle size of 1.2 μm measured by a coulter counter and 0.16 parts by weight of cross-linked polymer beads having an average particle size of 1.8 μm measured by a coulter counter as anti-blocking agents were mixed by a Henschel mixer, then, granulated by a 65 mmφ extruder at 220° C. to give pellets. The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Comparative Example 5

Comparative Example 4 was repeated except using 20 parts by weight of the propylene polymer A1 and 80 parts by weight of the powder of the propylene polymer B2 in stead of 100 parts by weight of the propylene polymer powder A1.

The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Comparative Example 6

Comparative Example 4 was repeated except using 80 parts by weight of the propylene polymer A1 and 20 parts by weight of the powder of the propylene polymer B3 in stead of 100 parts by weight of the propylene polymer powder A1.

The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

Comparative Example 7

Comparative Example 4 was repeated except using 80 parts by weight of the propylene polymer A1 and 20 parts by weight of the powder of the propylene polymer B4 in stead of 100 parts by weight of the propylene polymer powder A1.

The results of measurement of the physical properties of the resulted propylene-based resin composition are shown in Table 2, and the results of measurement of the physical properties and the results of evaluation of stretching processability of a stretched film obtained by using this polypropylene-based resin composition are shown in Table 3.

TABLE 1

| Sample | [η] (dl/g) | Meso-pentad fraction | CXS (wt %) | Tm (° C.) |
|---|---|---|---|---|
| A-1 | 2.11 | 0.883 | 2.7 | 160.4 |
| A-2 | 2.35 | Unmeasurable | 6.2 | 133.6 |
| B-1 | 0.94 | 0.980 | 0.56 | 162.1 |

TABLE 1-continued

| Sample | [η] (dl/g) | Meso-pentad fraction | CXS (wt %) | Tm (° C.) |
|---|---|---|---|---|
| B-2 | 1.59 | 0.952 | 1.2 | 162.4 |
| B-3 | 1.63 | Unmeasurable | 3.8 | 140.0 |
| B-4 | 0.77 | 0.983 | 0.36 | 161.8 | shrinkage percentage, and the composition of Comparative Example 3 containing no propylene-based polymer(A) which is required in the present invention manifests insufficient stretching processability. Further, it is found that the composition of Comparative Example 5 in which the Tm of the propylene-based polymer(A) is out of the range of the present invention, is insufficient in transparency, the composition of Comparative Example 6 in which the Tm of the propylene-based polymer(B) is out of the range of the present invention, is insufficient in Young's modulus

TABLE 2

Preparation of polypropylene resin composition

| | Propylene-based polymer (A) | Propylene-based polymer (B) | Blending ratio A/B (wt %) | Amount of Antistatic Agent (wt %) | [η] ratio A/B | Tm ratio A/B | MFR (g/10 min.) | Tm (° C.) | CXS (wt %) |
|---|---|---|---|---|---|---|---|---|---|
| Example 1 | A-1 | B-1 | 90/10 | 0.5 | 2.24 | 0.99 | 3.2 | 159.1 | 3.2 |
| Example 2 | A-1 | B-2 | 90/10 | 0 | 1.29 | 0.98 | 2.8 | 160.1 | 2.5 |
| Example 3 | A-1 | B-2 | 80/20 | 0 | 1.29 | 0.98 | 3.2 | 161.0 | 2.1 |
| Comparative Example 1 | A-1 | — | 100/0 | 0.5 | — | — | 2.4 | 159.5 | 3.5 |
| Comparative Example 2 | A-1 | — | 100/0 | 0.5 | — | — | 3.1 | 157.9 | 3.5 |
| Comparative Example 3 | — | B-1 | 0/100 | 0.5 | — | — | 120.0 | 161.9 | 0.7 |
| Comparative Example 4 | A-1 | — | 100/0 | 0 | — | — | 2.1 | 160.2 | 2.8 |
| Comparative Example 5 | A-2 | B-2 | 20/80 | 0 | 1.48 | 0.82 | 5.8 | 156.3 | 2.4 |
| Comparative Example 6 | A-1 | B-3 | 80/20 | 0 | 1.29 | 1.15 | 3.1 | 156.1 | 2.9 |
| Comparative Example 7 | A-1 | B-4 | 80/20 | 0 | 2.74 | 0.99 | 6.3 | 160.8 | 2.4 |

TABLE 3

| | Haze (%) | Antiblocking property (g/cm$^2$) | Young's modulus MD (kg/cm$^2$) | Young's modulus TD (kg/cm$^2$) | Heat shrinkage percentage MD (%) | Heat shrinkage percentage TD (%) | Stretching processability (kg/cm$^2$) |
|---|---|---|---|---|---|---|---|
| Example 1 | 2.0 | 0.83 | 21000 | 41400 | 3.1 | 1.3 | 12.5 |
| Example 2 | 2.7 | 0.11 | 20700 | 42300 | 3.2 | 2.2 | 12.4 |
| Example 3 | 3.0 | 0.09 | 20900 | 43300 | 2.9 | 2.2 | 13.4 |
| Comparative Example 1 | 1.9 | 3.33 | 20100 | 40100 | 3.8 | 1.9 | 11.7 |
| Comparative Example 2 | 1.8 | 0.00 | 19900 | 40300 | 3.7 | 1.9 | 12.1 |
| Comparative Example 3 | — | — | — | — | — | — | Stretching impossible |
| Comparative Example 4 | 2.0 | 0.1 | 20400 | 42500 | 3.3 | 2.6 | 11.7 |
| Comparative Example 5 | 5.4 | 0.00 | 21200 | 45400 | 2.6 | 1.5 | 12.4 |
| Comparative Example 6 | 1.9 | 0.06 | 19300 | 36700 | 4.2 | 2.4 | 9.3 |
| Comparative Example 7 | 3.1 | 0.07 | 20700 | 44900 | 2.1 | 1.5 | 14.1 |

It is found that the composition of Example 1 satisfying the requirements of the invention is excellent in haze (transparency), anti-blocking property, Young's modulus (rigidity), heat shrinkage percentage and stretching processability.

On the other hand, it is found that the compositions of Comparative Examples 1, 2 and 4 containing no propylene-based polymer(B) which is required in the present invention manifest insufficient Young's modulus (rigidity) and heat (rigidity) and heat shrinkage percentage, and the composition of Comparative Example 7 in which the intrinsic viscosity [η] of the propylene-based polymer(B) is out of the range of the present invention, is insufficient in stretching processability.

As described in detail above, according to the present invention, a polypropylene-based resin composition for stretched film, having transparency and anti-blocking property maintained at practical levels and excellent in rigidity, heat contraction percentage and stretching processability, a process for producing this resin composition, and a stretched film obtained by using this resin composition, can be obtained.

What is claimed is:

1. A polypropylene-based resin composition for stretched film, comprising 20 to 98 parts by weight of a propylene-based polymer(A) having an intrinsic viscosity $[\eta]^A$ measured in tetralin at 135° C. of 1.8 to 8 dl/g and a melting temperature $Tm^A$ measured by a differential scanning calorimeter of 140 to 165° C. 2 to 80 parts by weight of a propylene-based polymer(B) having an intrinsic viscosity $[\eta]^B$ measured in tetralin at 135° C. of 0.8 to 1.7 dl/g and a melting temperature $Tm^B$ measured by a differential scanning calorimeter of 150 to 170° C., wherein the ratio of the melting temperature $Tm^A$ of the propylene-based polymer (A) to the melting temperature $Tm^B$ of the propylene-based polymer(B) is less than 1, the ratio of the intrinsic viscosity $[\eta]^A$ of the propylene-based polymer(A) to the intrinsic viscosity $[\eta]^B$ of the propylene-based polymer(B) is more than 1 and less than 10, and the melt flow rate of the polypropylene-based resin composition is from 0.1 to 20 g/10 min.

2. A process for producing the polypropylene-based resin composition of claim 1, which comprises separately producing a propylene-based polymer(A) and a propylene-based polymer(B) and mixing the polymer(A) and the polymer(B) obtained separately.

3. A process for producing the polypropylene-based resin composition of claim 1, which comprises, in a multi-stage polymerization, producing a propylene-based polymer(A) and a propylene-based polymer(B) in different stage each other, and in any stage.

4. A polypropylene-based stretched film obtained by stretching the polypropylene-based resin composition of claim 1 to a uniaxial or biaxial direction.

* * * * *